United States Patent
Shepherd, Jr. et al.

(10) Patent No.: US 10,796,141 B1
(45) Date of Patent: Oct. 6, 2020

(54) SYSTEMS AND METHODS FOR CAPTURING AND PROCESSING IMAGES OF ANIMALS FOR SPECIES IDENTIFICATION

(71) Applicants: James W. Shepherd, Jr., Birmingham, AL (US); Wesley E. Snyder, Raleigh, NC (US)

(72) Inventors: James W. Shepherd, Jr., Birmingham, AL (US); Wesley E. Snyder, Raleigh, NC (US)

(73) Assignee: SPECTERRAS SBF, LLC, Birmingham, AL (US)

( * ) Notice: Subject to any disclaimer, the term of this patent is extended or adjusted under 35 U.S.C. 154(b) by 0 days.

(21) Appl. No.: 16/011,086

(22) Filed: Jun. 18, 2018

Related U.S. Application Data

(60) Provisional application No. 62/521,118, filed on Jun. 16, 2017.

(51) Int. Cl.
*G06T 7/20* (2017.01)
*G06T 7/207* (2017.01)
(Continued)

(52) U.S. Cl.
CPC ...... *G06K 9/00369* (2013.01); *A01K 39/0106* (2013.01); *G06K 9/00771* (2013.01); *G06K 9/44* (2013.01); *G06K 9/6202* (2013.01)

(58) Field of Classification Search
CPC ....... G06T 2200/04; G06T 2207/10028; G06T 2207/20036; G06T 2207/30004; G06T 7/0012; G06T 7/40; G06T 7/41
(Continued)

(56) References Cited

U.S. PATENT DOCUMENTS

| | | | |
|---|---|---|---|
| 6,741,757 B1 * | 5/2004 | Torr | G06K 9/00154 382/285 |
| 8,482,613 B2 | 7/2013 | Kempf | |

(Continued)

OTHER PUBLICATIONS

"Wingscapes BirdCam Pro," 2017, http://www.wingscapes.com/wingscapes-birdcam-pro-11046.
(Continued)

*Primary Examiner* — Joseph Arevalo
(74) *Attorney, Agent, or Firm* — Maynard Cooper & Gale, P.C.; Jon E. Holland

(57) ABSTRACT

Systems and methods are provided for capturing images of animals for the purpose of identifying the animal. A camera can be positioned to capture images of an animal at a feeding station. A member can be positioned on the opposite side of the feeding station from the camera to provide a common background for the images captured by the camera. When an image is captured by the camera, a determination is made as to whether an animal is present in the image. If an animal is determined to be present in the image, a segmentation algorithm can be used to remove (or make black) the background pixels from the image leaving only the pixels associated with the animal. The image with only the animal pixels can be provided to animal recognition software for identification of the animal. In some embodiments captured images can be used to create synthetic images for training without requiring segmentation for the identification process.

25 Claims, 10 Drawing Sheets

(51) Int. Cl.
*G06K 9/00* (2006.01)
*G06K 9/62* (2006.01)
*A01K 39/01* (2006.01)
*G06K 9/44* (2006.01)

(58) Field of Classification Search
USPC .............. 382/100, 103, 110, 128, 284, 181
See application file for complete search history.

(56) References Cited

U.S. PATENT DOCUMENTS

| | | | |
|---|---|---|---|
| 8,555,812 | B2 | 10/2013 | Nowacek |
| 9,137,974 | B2 | 9/2015 | Boehm |
| 9,247,719 | B1 | 2/2016 | Bennett et al. |
| 9,521,830 | B2 | 12/2016 | Wenger et al. |
| 2010/0214410 | A1* | 8/2010 | McClure ............ G08B 13/1961 348/143 |
| 2011/0066952 | A1 | 3/2011 | Kinch |
| 2011/0279650 | A1* | 11/2011 | Liao ..................... G06T 7/41 348/46 |
| 2013/0155235 | A1* | 6/2013 | Clough ............... G06K 9/0063 348/144 |
| 2013/0275894 | A1 | 10/2013 | Bell et al. |
| 2014/0089243 | A1* | 3/2014 | Oppenheimer ......... G06F 21/50 706/46 |
| 2014/0313345 | A1* | 10/2014 | Conard ............. G06K 9/00664 348/169 |
| 2015/0062333 | A1 | 3/2015 | Kilner |
| 2015/0216145 | A1 | 8/2015 | Nelson |
| 2015/0223442 | A1* | 8/2015 | Yamauchi ............. A01M 1/026 43/121 |
| 2015/0229838 | A1 | 8/2015 | Kinan et al. |
| 2015/0264893 | A1 | 9/2015 | Kendall |
| 2016/0132750 | A1* | 5/2016 | Yang ................... G06F 16/56 382/197 |
| 2016/0156989 | A1 | 6/2016 | Lovett |
| 2016/0366319 | A1 | 12/2016 | Perkins |
| 2017/0070933 | A1* | 3/2017 | Hagiwara ............ G06F 9/5077 |
| 2018/0189642 | A1* | 7/2018 | Boesch ................ G06N 3/0454 |
| 2019/0025854 | A1* | 1/2019 | Rohani ................ G05D 1/0088 |

OTHER PUBLICATIONS

"Putting Merlins New Bird Photo ID Tool Test," Dec. 12, 2016, http://www.audubon.org/news/putting-merlins-new-bird-photo-id-tool-test.

"Bird Photo Booth," 2017, https://birdphotobooth.com/.

* cited by examiner

US 10,796,141 B1

SYSTEMS AND METHODS FOR CAPTURING AND PROCESSING IMAGES OF ANIMALS FOR SPECIES IDENTIFICATION

CROSS REFERENCE TO RELATED APPLICATION

This application claims the benefit of U.S. Provisional Application No. 62/521,118, entitled "Systems and Methods for Capturing and Processing Images of Animals for Species Identification" and filed on Jun. 16, 2017, which is incorporated herein by reference.

BACKGROUND

The present application generally relates to systems and methods to capture images of animals for the purpose of identifying the animal. More specifically, the present application is directed to capturing images of birds at a feeding station and then processing the captured images in order to better recognize the type of birds that are present at the feeding station.

Watching animals or wildlife is a common activity for many people. In particular, bird watching is a hobby or form of relaxation for many people. To make bird watching more convenient, a person can place a bird feeder (or feeding station) near the person's home. The bird feeder can attract birds in the area to visit the bird feeder so that the person can view the birds. A camera can be set-up near the bird feeder to capture images or videos of the birds at the bird feeder when the person is not able to view the bird feeder in person. While watching bird activity at a bird feeder or other location, a person is often interested in knowing the species of birds that are present at the bird feeder.

However, it can be difficult for a person to manually identify the species of birds being watched by the person. In this regard, the birds may only be viewed for a short time or be positioned at an awkward angle when viewed, making species identification difficult. Further, there are many different species of birds, and determining the species of many birds, with or without the foregoing viewing difficulties, can be challenging. To facilitate species identification, attempts have been made to capture bird images with a camera and then use species identification software to analyze the captured images and automatically identify the species of birds in the images. However, capturing images of birds in the wild presents many challenges for automatic species identification. As an example, there is very little consistency from image-to-image regarding bird orientation, lighting conditions, background, and other factors that can impact image analysis for species identification. In an effort to improve the accuracy of species identification programs, attempts have been made to improve automatic bird identification using machine learning. Despite such efforts, the accuracy of many species identification programs is still well below what is desired by many bird enthusiasts.

SUMMARY

The present application is directed to systems and methods for capturing images of animals for the purpose of identifying the animal. A camera can be positioned to capture images of an animal at a feeding station. An apparatus can be positioned on the opposite side of the feeding station from the camera and have at least one surface visible for providing a common background for the images captured by the camera. When an image is captured by the camera, a determination is then made as to whether an animal is present in the image. If an animal is determined to be present in the image, a segmentation algorithm can be used to remove background pixels from the image leaving only the pixels associated with the animal. Such animal pixels can then be provided to animal recognition software for identification of the animal.

One advantage of the present application is that it provides an image of the bird or other animal (without substantial background detail) to the identification or recognition program.

Another advantage of the present application is that shadows can be removed from the captured image and excluded from the image provided to the identification program.

Still another advantage of the present application is that it incorporates an apparatus having at least one surface that provides a common background for images that can then be easily removed when preparing the image of the bird for the identification program.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
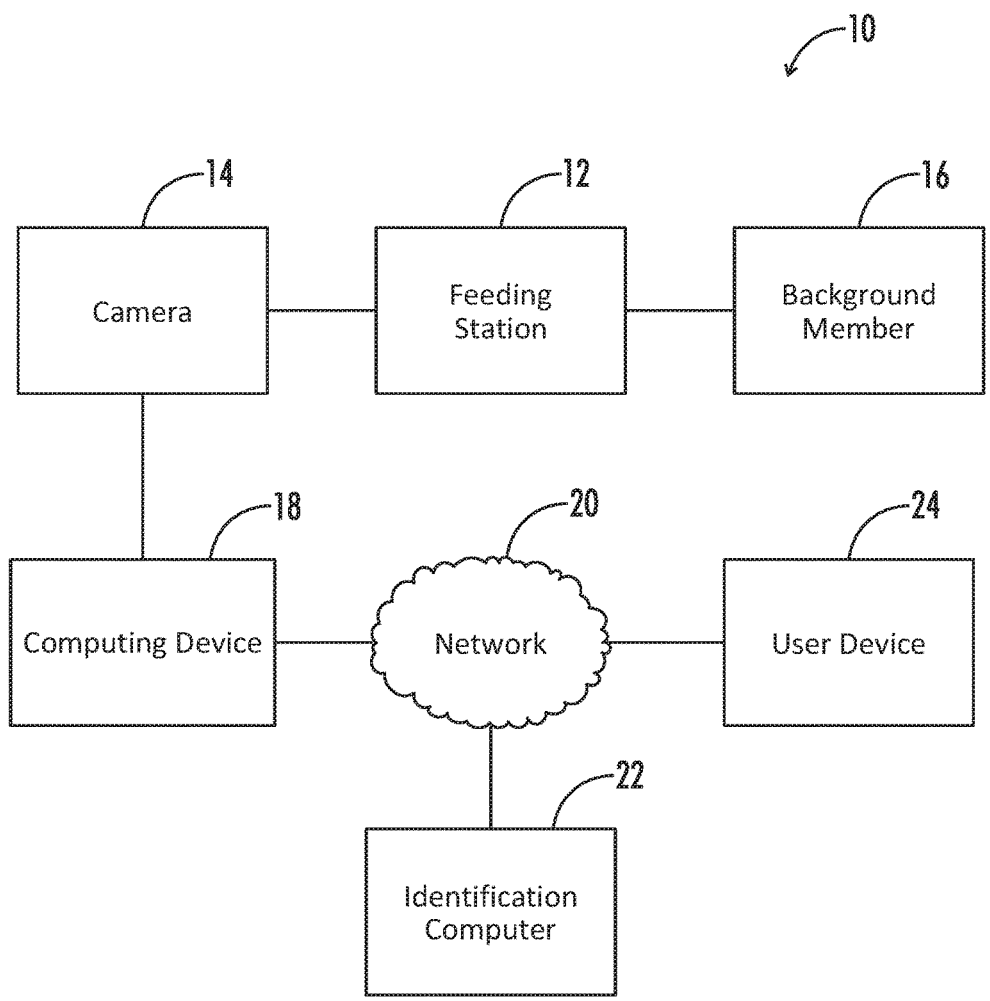
FIG. 1 is a block diagram showing an embodiment of a bird identification system.

The present application generally pertains to systems and methods for capturing and processing images of animals for species identification. A camera can be positioned near a feeding station to capture images of animals that approach the feeding station. An apparatus, referred to herein as "background member," can also be positioned near the feeding station and have at least one surface to provide a constant background display in the images that are captured by the camera. The background member can have a predefined color or colors in order to provide the constant background display and can be positioned on the opposite side of the feeding station from the camera. In one embodiment, both the camera and the background member can be mounted on the feeding station to form a single unit that can be positioned in a desired location.

A background image of the feeding station and the background member can be captured prior to any animals being present at the feeding station. The background image can serve as a baseline for comparison with subsequent images captured by the camera. The camera can capture images at different intervals depending on whether or not an animal is believed to be visiting the feeding station. The images captured by the camera can be provided to a computing device that determines whether an animal is present at the feeding station and prepares, if an animal is present, an evaluation image for analysis by animal recognition software. The animal recognition software may be executed by the computing device or another computer coupled to the computing device by a network such as the Internet. The animal recognition software can identify the animal in the evaluation image and provide the identification of the animal back to the computing device and/or to a user device operated by the user of the system.

The computing device can determine whether an animal is present at the feeding station by comparing the captured image from the camera to a corresponding background image. To compare the images, the computing device generates a difference image by subtracting the pixel values of one image from the other. Specifically, the difference values can be determined by calculating, for each x-y coordinate, the difference between a pixel in the captured image and the corresponding pixel in the background image. Prior to calculating the difference values, one of the background image or the captured image is adjusted such that there is a direct correspondence between the pixels. The adjustments can include both geometric adjustments and radiometric adjustments. The geometric adjustments are performed to ensure a pixel associated with a particular landmark (e.g., an edge) in the background image corresponds to a pixel associated with the same landmark in the captured image. Radiometric adjustments can be performed to ensure that the brightness level of the pixels (e.g., a measure of strength of a pixel whether defined in terms or grayscale or color) in the background image correspond to the same brightness level in the captured image, which brightness levels can vary based on factors such as time of day and cloud cover.

The computing device can then determine if an animal is present at the feeding station by reviewing the absolute value of the difference values in the difference image. If the computing device identifies a predefined number of pixels having values greater than a threshold value within a predetermined area of the difference image, then the computing device determines that an animal is present at the feeding station. Once an animal is determined to be present at the feeding station, the computing device may generate the evaluation image (that is sent to the recognition software) by removing the pixels not associated with the animal (e.g., setting all of the pixels not associated with the animal to a predetermined value). Based on the difference values in the difference image, the computing device begins identifying whether each pixel is associated with the animal or is associated with the background. The computing device can further process the difference image to identify any pixels totally within a group of pixels associated with the animal that may have been misidentified as background pixels. The computing device can convert those misidentified pixels to pixels associated with the animal. In addition, the computing device can use the difference values to identify if there are any shadows in the difference image that may have been identified as pixels associated with the animal. A shadow can be identified in the image as a corresponding group of pixels that have substantially the same difference value within a predefined range. The group of pixels that form the shadow in the difference image can have substantially the same difference values since the difference between the captured image and the background image in the area of the shadow is a change in the brightness level of the pixels caused by the shadow (and not by other ambient conditions). If any "shadow" pixels are identified, the shadow pixels can be designated as background pixels and processed similar to other background pixels. The evaluation image can then be generated by the computing device assigning the pixels corresponding to the animal to the value of the corresponding pixel in the captured image and by removing the remaining pixels (i.e., the background pixels). In one embodiment, the evaluation image can include just a list of the pixels and corresponding pixel values that have been designated as animal pixels. In another embodiment, the evaluation image can include the animal pixels with the remaining pixels being assigned a predetermined value, such as zero. In other embodiments, other techniques may be used to remove the background pixels from the animal pixels.

FIG. 1 shows an embodiment of an animal identification system 10. The system 10 includes a feeding station 12, a camera 14 and a background member 16. The feeding station 12 (e.g., a bird feeder) can have one or more openings with access to food, water and/or other types of attractants to draw one or more animals (e.g., birds) to the feeding station 12. In addition, the feeding station 12 may include perches or other structures to permit an animal to gain access to the food, water or attractant via the openings in the feeding station 12. The camera 14 can be positioned in proximity to the feeding station 12 such that the field of view of the camera 14 is directed towards the feeding station 12 in order to capture images or videos of animals visiting the feeding station 12. The background member 16 can be positioned in proximity to the feeding station 12 and opposed to the camera 14 to provide a predetermined background display to at least a portion of each of the images captured by the camera 14. In one embodiment, the background member 16 and the camera 14 can be connected to the feeding station 12 (as shown in FIG. 1). However, in other embodiments, one or both of the background member 16 and the camera 14 can be mounted separately from the feeding station 12. In still other embodiments, the background member 16 may not be used in the system 10.

In one embodiment, the background member 16 and/or the feeding station 12 can be a single color (e.g., white, black, green, blue, etc.) to provide the predetermined background display in the captured images of the camera 14. However, in other embodiments, the predetermined background display of the background member 16 and/or the feeding station 12 may use multiple individual colors, may incorporate one or more patterns, may incorporate one or more scenes or may use a random arrangement of colors. The background member 16 can include a single panel or multiple panels in one embodiment. In another embodiment, the background member 16 may have a planar surface and/or a curved surface. For example, depending on the configuration of the feeding station 12, the background member 16 may be formed from one or more panels that may be mounted on the left side, right side, top and bottom of the feeding station 12. The background member 16 can be sized and positioned relative to the feeding station 12 such that the background member 16 is within most or all of the field of view of the camera 14.

The camera 14 can be coupled to a computing device 18 and can provide the captured images of animals at the feeding station 12 to the computing device 18. The camera 14 can communicate wirelessly (i.e., via electromagnetic or acoustic waves carrying a signal) with the computing device 18, but it is possible for the camera 14 to communicate with the computing device 18 over a conductive medium (e.g., a wire), fiber, or otherwise. The computing device 18, which can include multiple computing devices at different locations connected by a network, can process the images from the camera 14 as described in detail below and can provide the processed images to an identification computer 22 over a network 20. The identification computer 22 has an animal identification program (e.g., a bird recognition program) that can review the image(s) from the computing device 18 and can identify the type or species of animal (e.g., bird) that is present in the image. Once identified, the identification computer 22 can provide the information on the type or species of animal in the image over network 20 to a user device 24 and/or the computing device 18 for subsequent review by a user of system 10.

The user device 24 can be communicatively coupled to the network 20 and may be any device capable of exchanging (i.e., sending and receiving) instructions, data and/or information with another device (e.g., identification computer 22 or computing device 18). The user device 24 can be, but is not limited to, a desktop, laptop or tablet computer, a hand-held device, such as a cellular telephone (e.g., a smartphone) or portable gaming device, a television, a video game system, a still and/or video camera, and/or an attachable, wearable, implantable or non-invasive computer or device. The user device 24 can have one or more input devices to permit a user to enter instructions, data and/or information and one or more output devices to permit the user to display instructions, data and/or information received from the identification computer 22. In one embodiment, the user device 24 can include a touch screen interface that can both display content received from the identification computer 22 and receive touch inputs from the user. In another embodiment, the user device 24 can operate as the computing device 18 and process images for the identification computer 22. In still another embodiment, the user device 24 can receive images directly from camera 14 via the network 20 or from the computing device 18 via the network 20.

The network 20 can be the Internet and use the transmission control protocol/Internet protocol (TCP/IP) for communication in an embodiment. However, in other embodiments, the network 20 may be an Intranet, a local area network (LAN), a wide area network (WAN), a Near Field Communication (NFC) network, or any other type of communication network using one or more communication protocols.

The animal identification system 10 can be used to capture images of an animal and process the captured images for subsequent analysis by an animal recognition program. In one embodiment, as described in detail below with respect to FIGS. 4-7D, the animal identification system 10 can be used to capture images of a bird at a bird feeder and then send a processed image of the bird to a bird recognition program for identification of the bird.

Figure 2:
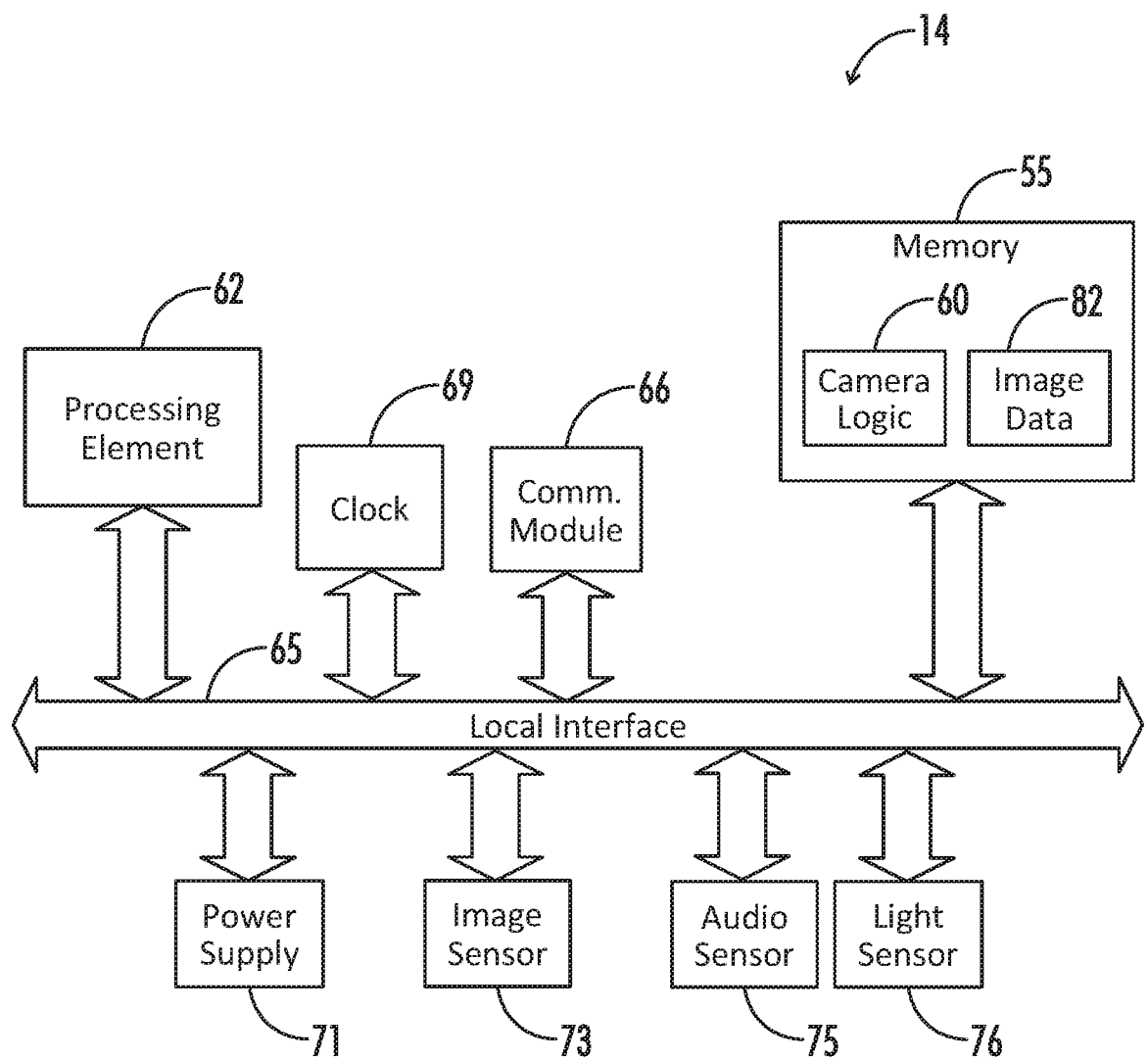
FIG. 2 is a block diagram showing an embodiment of a camera.

FIG. 2 shows an embodiment of camera 14 that can be used with the identification system 10. The camera 14 shown in FIG. 2 can include logic 60, referred to herein as "camera logic," which may be implemented in software, firmware, hardware, or any combination thereof. In FIG. 2, the camera logic 60 is implemented in software and stored in memory 55. However, other configurations of the camera logic 60 are possible in other embodiments. The camera logic 60, when implemented in software, can be stored and transported on any computer-readable medium for use by or in connection with an instruction execution apparatus that can fetch and execute instructions.

The embodiment of the camera 14 shown in FIG. 2 can include at least one conventional processing element 62, which can incorporate processing hardware for executing instructions stored in the memory 55. As an example, the processing element 62 may include a central processing unit (CPU) or a digital signal processor (DSP). The processing element 62 can communicate to and drive the other elements within the camera 14 via a local interface 65, which can include at least one bus. The camera 14 can have a clock 69, which can be used to track time.

The camera 14 can have a communication module 66 to permit communication with the computing device 18 and/or the user device 24. In one embodiment, the communication module 66 can include a radio frequency (RF) radio or other device for communicating wirelessly with computing device 18 and/or user device 24 over network 20 or over a local network, such as a WiFi network. However, in another embodiment, the communication module 66 can also include an Ethernet port to receive an Ethernet cable or a "category 6" cable. In other embodiments, other technology for enabling communication with the communication module 66 can be used. The power supply 71 has an interface that allows it to plug into or otherwise interface with an external component, such as an electrical outlet or battery, and receive electrical power from the external component.

As shown by FIG. 2, the camera 14 can also include an image sensor 73, an audio sensor 75 and a light sensor 76. The image sensor 73 can be used to record, capture or obtain images or videos of the area surrounding or in proximity to the camera 14, (i.e., the bird(s), the feeding station 12 and/or the background member 16). The image sensor 73 can be controlled by the camera logic 60 to capture images at a predetermined time interval (e.g., every 1 or 2 seconds) and at predetermined time periods (e.g., during daylight hours). In one embodiment, the computing device 18 can establish the predetermined time interval and the predetermined time period used by the camera logic 60. The audio sensor 75 or microphone, if used, can record sound or noise occurring in the area surrounding or in proximity to the camera 14. The light sensor 76 can be configured to sense ambient light in the area surrounding the camera 14.

The image sensor 73 can include one or more CCDs (charge coupled devices) and/or one or more active pixel sensors or CMOS (complementary metal-oxide-semiconductor) sensors. The images or videos from the image sensor 73 can be stored as image data 82 in memory 55. The image data 82 can be stored in any appropriate file format, including, but not limited to, PNG (portable network graphics), JPEG (joint photographic experts group), TIFF (tagged image file format), MPEG (moving picture experts group), WMV (Windows media video), QuickTime and GIF (graphics interchange format). The sound recordings from audio sensor 75 may be incorporated into the video file from the image sensor 73 and stored in image data 82. If the sound recording from the audio sensor 75 is not part of the video file, then the sound recording can be stored in any appropriate file format, including, but not limited to, WAV (waveform audio), MP3 (MPEG Layer III Audio), WMA (Windows media audio) and MPEG and saved in image data 82 or elsewhere in memory 55.

From time-to-time, the camera logic 60 can be configured to transmit the image data 82 to the computing device 18. The image data 82 may be processed by the computing device 18 to isolate the pixels of a captured image that relate to a bird. For example, to isolate the pixels that relate to a bird, the computing device 18 may set the remaining pixels (i.e., the background pixels) to a predetermined value or color (e.g., black). The image data 82 can be time-stamped based on the time indicated by the clock 69 in order to indicate when the image data 82 was obtained. The image data 82 may be presented to a user for review. In one embodiment, each component of camera 14 shown by FIG. 2 can reside on and be integrated with a printed circuit board (PCB). However, in other embodiments, other arrangements of the camera 14 are possible.

In one embodiment, the camera 14 can be positioned at a predetermined distance from the feeding station 12 and use a fixed focal length lens. However, in other embodiments, the camera 14 may be placed at a variable distance from the feeding station 12 and have a lens with adjustable zoom and focus (either manually or automatically). In addition, camera 14 may be able to adjust the exposure (length of time in each frame that the target accepts light), gain (of the internal amplifiers used to process the image), and iris (of the attached lens).

Figure 3:
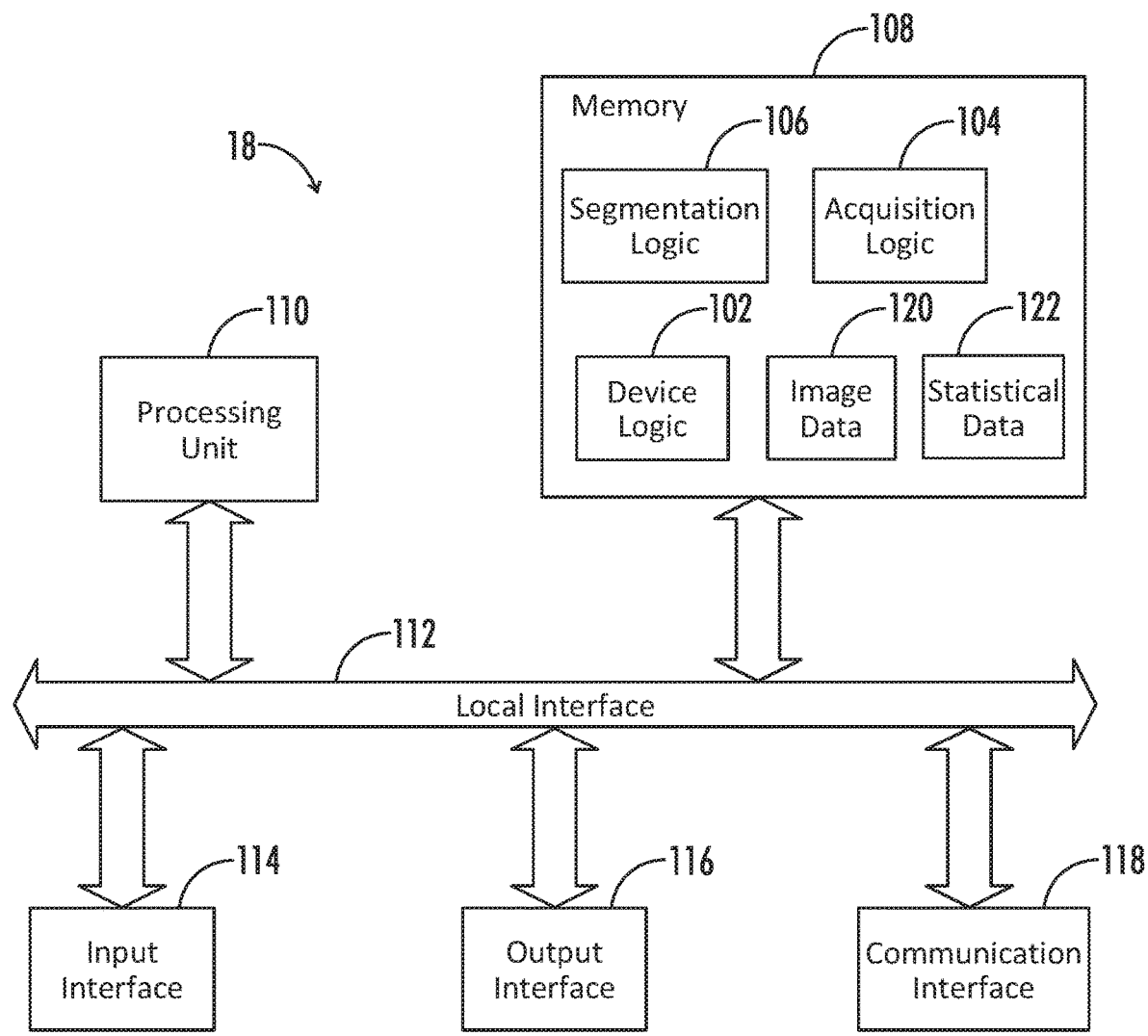
FIG. 3 is a block diagram showing an embodiment of a computing device.

FIG. 3 shows an embodiment of the computing device 18. The computing device 18 may be implemented as one or more general or special-purpose computers, such as a laptop, hand-held (e.g., smartphone), desktop, or mainframe computer, and which may include user device 24. The computing device 18 can include logic 102, referred to herein as "device logic," for generally controlling the operation of the computing device 18, including communicating with the camera 14 and the identification computer 22 of the identification system 10. The computing device 18 also includes acquisition logic 104 to determine when a bird is present in the image and segmentation logic 106 to remove background information, such as the background display provided by the background member 16, leaving substantially only the bird in the image. The device logic 102, the acquisition logic 104 and the segmentation logic 106 can be implemented in software, hardware, firmware or any combination thereof. In the computing device 18 shown in FIG. 3, the device logic 102, the acquisition logic 104 and the segmentation logic 106 are implemented in software and stored in memory 108 of the computing device 18. Note that the device logic 102, the acquisition logic 104 and the segmentation logic 106, when implemented in software, can be stored and transported on any non-transitory computer-readable medium for use by or in connection with an instruction execution apparatus (e.g., a microprocessor) that can fetch and execute instructions. In the context of this application, a "computer-readable medium" can be any device, system or technique that can contain or store a computer program for use by or in connection with an instruction execution apparatus.

The computing device 18 includes at least one conventional processing unit 110, which has processing hardware for executing instructions stored in memory 108. As an example, the processing unit 110 may include a digital signal processor or a central processing unit (CPU). The processing unit 110 communicates to and drives the other elements within the computing device 18 via a local interface 112, which can include at least one bus. In other embodiments, the computing device 18 can include multiple processing units to assist with the processing of the images. Furthermore, an input interface 114, for example, a keyboard, a mouse, touchscreen, sensor or any other interface device or apparatus, can be used to input data from a user of the computing device 18, and an output interface 116, for example, a printer, monitor, liquid crystal display (LCD), or other display apparatus, can be used to output data to the user of the computing device 18. Further, a communication interface 118, such as at least one modem, may be used to communicate with camera 14 or communicate data over the network 20.

As shown by FIG. 3, image data 120 can be stored in memory 108 or other machine-readable media at the computing device 18. The image data 120 can include the images from camera 14 and processed images from the segmentation logic 106 and/or the acquisition logic 104. The images from the camera 14 stored in image data 120 can be used by the acquisition logic 104 and the segmentation logic 106 in the bird identification process. Statistical data 122 can also be stored in memory 108 at the computing device 18. The statistical data 122 can store information regarding the birds at the feeding station 12. The statistical data 122 can include the number of birds that visit the feeding station 12, the types of birds that visit the feeding station 12, the time the bird spends at the feeding station 12, the frequency with which a particular type of bird visits the feeding station 12, the time of day when a particular type of bird visits the feeding station 12, etc. The statistical data 122 can then be sorted and filtered (as desired) and presented to a user at the computing device 18, the user device 24 or other device or location.

Figure 4:
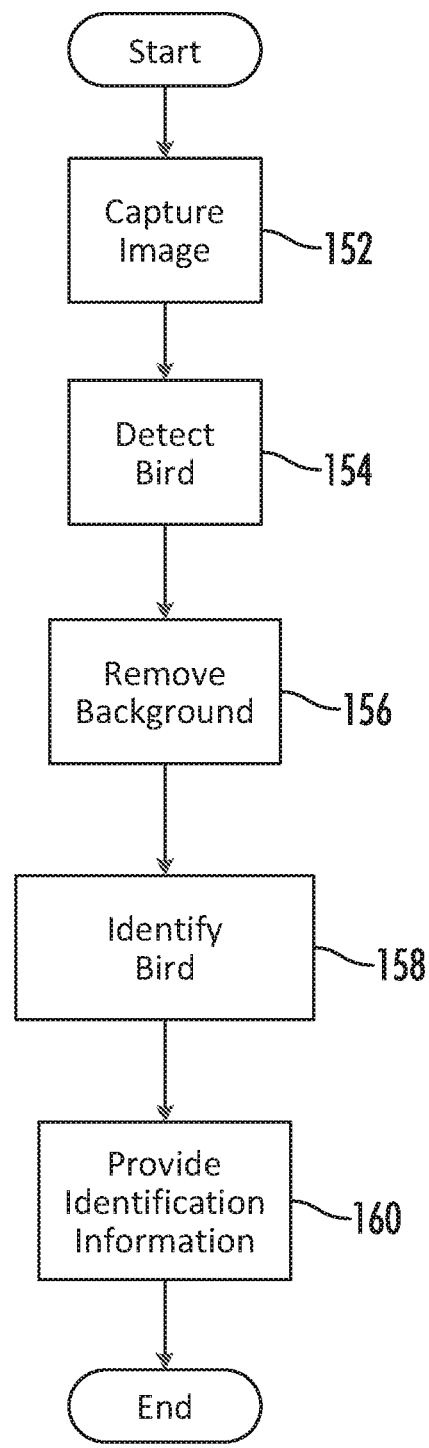
FIG. 4 shows an embodiment of a process for identifying a bird at a feeding station.

FIG. 4 shows an embodiment of a process for identifying a bird at a feeding station 12. The process begins with the camera 14 capturing an image of the feeding station 12, the background member 16 (if used) and possibly a bird (step 152). The camera 14 can capture images at a predetermined interval (e.g., 1 or 2 seconds) or in response to a signal from a sensor (e.g., a motion sensor, proximity sensor, temperature sensor, weight sensor, etc.) indicating that a bird is present at the feeding station 12 or moving in the area near the feeding station 12. The camera 14 can then provide the captured image(s) to the computing device 18. The camera 14 can provide images to the computing device 18 as the images are captured, at a predetermined time interval, (e.g., every 5 minutes) or in response to a request from the computing device 18. In one embodiment, if the camera 14 is coupled to network 20, the camera 14 can provide the captured images to user device 24 for review by a user in addition to providing the captured images to the computing device 18. If the camera 14 is not coupled to network 20, the computing device 18 may provide the captured images from the camera 14 to the user device 24.

The computing device 18 receives the captured images from camera 14 and stores the captured images as image data 120. The computing device 18 can then use acquisition logic 104 to determine if a bird is present in an image stored in the image data 120. When the acquisition logic 104 detects a bird in an image (step 154), the acquisition logic 104 or the device logic 102 can provide the image with the detected bird to the segmentation logic 106. In another embodiment, the camera 14 can determine if the bird is present in the captured image (i.e., perform step 154) prior to sending the captured image to the computing device 18, which would then provide the captured image to the segmentation logic 106.

The segmentation logic 106 can remove the background information from the image (step 156) attempting to leave only the pixels associated with the detected bird in the image. In one embodiment, the segmentation logic 106 can use a difference imaging framework to identify the bird in the image. However, the segmentation logic 106 can improve the segmentation accuracy based on just difference images by using an active contour model or snakes model, to identify the outline of the bird in the image. Once the bird has been identified, the remaining pixels in the image (i.e., the background) can be removed from the image (e.g., by setting the remaining pixels to a predetermined color such as white or black). In another embodiment, the background does not have to be removed from the captured image (i.e., step 156 may be omitted). If the background is not removed from the captured image, other processing of the captured image may be performed to enhance the captured image for subsequent use.

The computing device 18 may send the processed image or the captured image with the detected bird to the identification computer 22 via network 20. The identification computer 22 can execute bird recognition software to identify the bird in the processed image or the captured image (step 158). The bird recognition software can use machine learning techniques to improve the ability of the bird recognition software in identifying birds. In one embodiment, the bird recognition software can be the MERLIN® software from the Cornell Lab of Ornithology of Cornell University. However, in other embodiments, the bird recognition software may include additional or alternative bird recognition programs.

In another embodiment, the bird recognition software may be incorporated in the computing device 18. The computing device 18 can then identify the bird in the processed image from the segmentation logic 106 or in the captured image without having to send the processed image to the identification computer 22. In other words, the computing device 18 and the identification computer 22 may be the same computer. Once the type or species of bird has been identified by the bird recognition software, the results (i.e., the information on the type or species of bird) can be provided to one or both of the user device 24 and the computing device 18 for display to a user (step 160). The computing device 18 can store the information on the type or species of bird from the bird recognition software in the statistical data 122. In one embodiment, one or more images associated the identified bird may be provided to the user device 24 from the image data 120 of the computing device 18.

Figure 5:
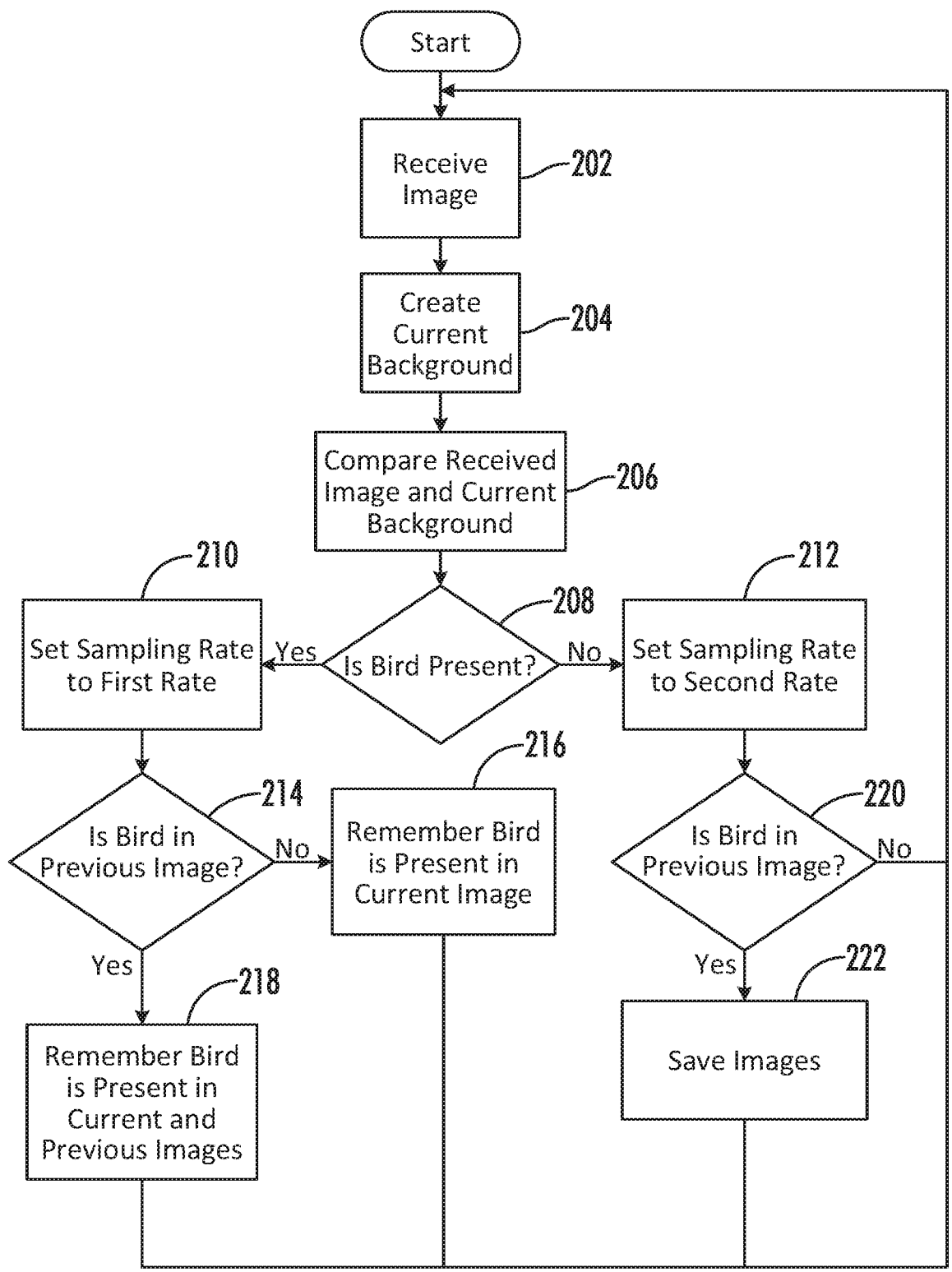
FIG. 5 shows an embodiment of a process for detecting a bird at a feeding station.

FIG. 5 shows an embodiment of a process for detecting the presence of a bird at a feeding station 12 from a captured image. In one embodiment, the process shown in FIG. 5 can be used in step 154 of FIG. 4 to determine if a bird is present in an image. In order to determine if a bird is present in a captured image, the captured image is compared to a corresponding background image that does not include a bird. To perform a more accurate comparison, the background image may be prepared such that it has a substantial correspondence to the captured image. The background image can be generated from a baseline image that does not include a bird. The baseline image can be modified based on information obtained from the captured image in order to generate the background image. Some modifications to the baseline image can include adjusting the brightness of the pixels in the baseline image to account for changes in the lighting conditions in the captured image and relocating pixels in the baseline image to account for any movement of components or features in the captured image. Once the background image is generated, the background image is compared to the captured image to determine if there are sufficient differences between the images such that a bird can be determined to be present in the captured image. It is noted that if a bird is not present in the captured image then there should be very few (or no) differences between the background image and the captured image.

Figure 7A:
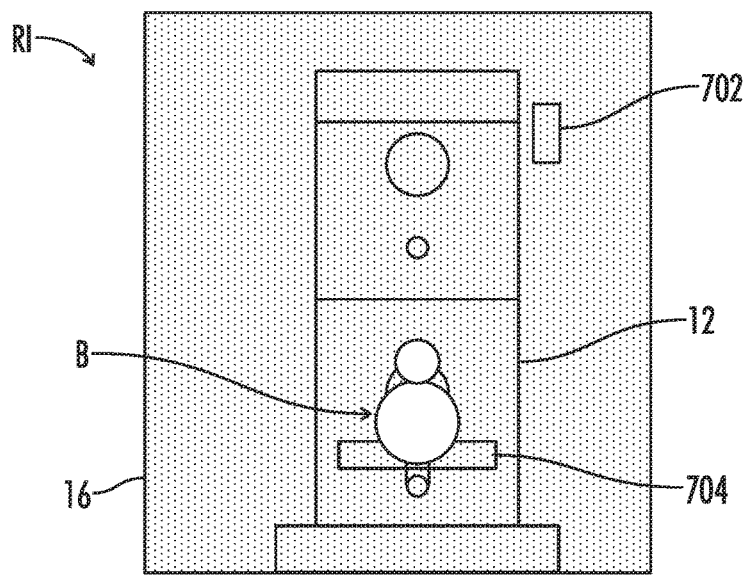
FIGS. 7A-7D schematically show embodiments of images that are used with the processes of FIG. 5 and FIGS. 6A and 6B.
Figure 7B:
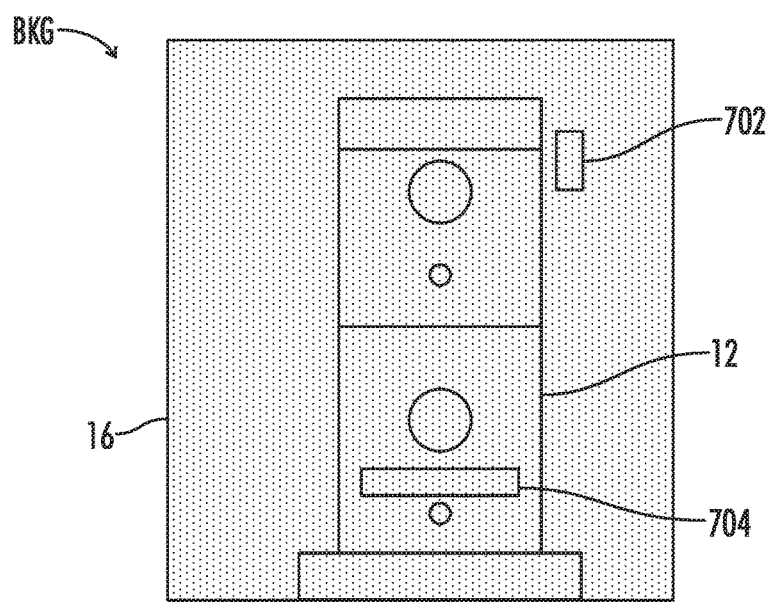

The process in FIG. 5 can begin with the acquisition logic 104 receiving an image (RI) either directly from the camera 14 or from the image data 120 (step 202). FIG. 7A shows an embodiment of a received image RI that includes the feeding station 12, the background member 16 and a bird (B) at the feeding station 12. A "current" background frame (BKG) can be created (step 204) that is used for comparison with the received image RI in order to identify the presence of a bird at the feeding station 12. FIG. 7B shows an embodiment of the background frame BKG that includes the feeding station 12 and the background member 16, but does not include the bird B. As can be seen in FIG. 7B, the background frame BKG includes the same location of the feeding station 12 and the same lighting conditions as is present in the received image RI shown in FIG. 7A, which particular lighting conditions are shown by shading.

Figure 7C:
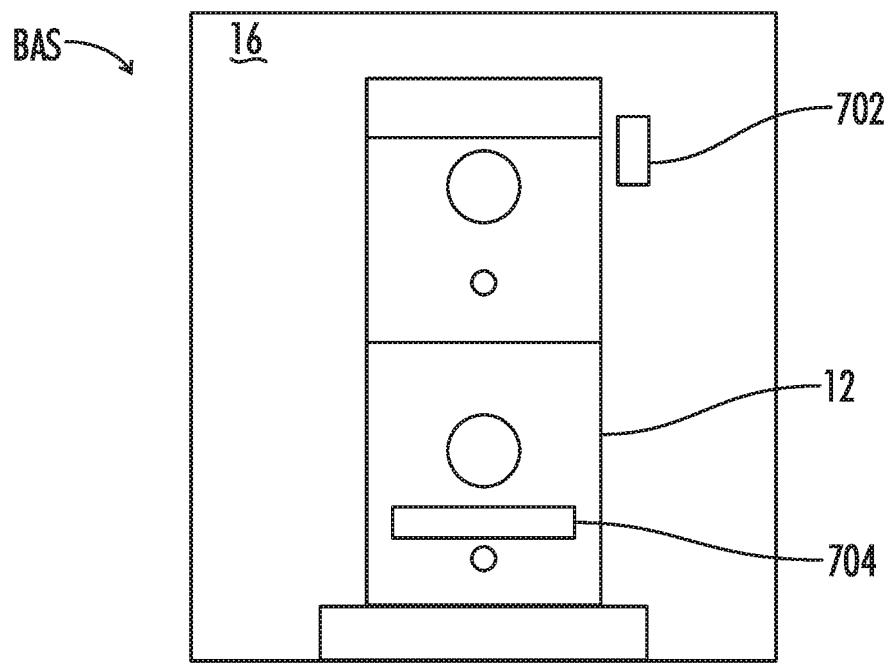

In one embodiment, the current background BKG can be based on a baseline frame (BAS) that can be stored in image data 120 or elsewhere in memory 108. FIG. 7C shows an embodiment of a baseline frame BAS that includes the feeding station 12 and the background member 16, but does not include the bird B. As can be seen in FIG. 7C, the baseline frame BAS has the feeding station 12 in a substantially centered position with respect to the background member 16 and does not have the same lighting conditions that are present in the received image RI shown in FIG. 7A. The baseline frame BAS corresponds to an image of the feeding station 12 and the background member 16 that does not include a bird in the image. The baseline frame BAS can be captured before the capturing of the received image RI. When generating the current background BKG for comparison with the received image RI, the acquisition logic 104 can identify one or more calibration regions (see e.g., region 702 of FIG. 7A) in the received image RI and use the information obtained from the calibration region(s) to modify the baseline frame BAS to obtain an appropriate current background BKG that can be used for comparison with the received image RI. In one embodiment, the calibration region(s) can be a fixed area of the feeding area 12 and/or the background member 16 that can be easily distinguished by the acquisition logic 104.

If the received image RI has shifted relative to the baseline frame BAS as a result of movement of one or more of the camera 14, the feeding station 12 and the background member 16, a geometric calibration can be performed in order to align the received image RI and the current background BKG, which is based on the baseline frame BAS, to provide a more accurate comparison between the received image RI and the current background BKG. The camera 14, the feeding station 12 and the background member 16 may move as a result of the application of external forces from sources such as the wind, the bird or other animals, being applied to the camera 14, the feeding station 12 and the background member 16. The acquisition logic 104 can perform a geometric calibration on the baseline frame BAS using information from the calibration region(s) in order to align the pixels in the current background BKG with the pixels in the received image RI such that the pixels have a direct geometric correspondence. In other words, geometric calibration is performed to ensure that a pixel at a first set of coordinates in the current background BKG corresponds to the same pixel in the received image RI having the same coordinates (i.e., the first set of coordinates). The acquisition logic 104 can determine the distance and direction that a pixel in the baseline frame BAS has deviated from the corresponding pixel in the received image RI based on the corresponding location of the calibration region(s) in the baseline frame BAS relative to the calibration region(s) in the received image RI. Once the distance and direction of the deviation are determined, the pixels in the baseline frame BAS can be shifted by the corresponding distance and direction when generating the current background BKG to provide the appropriate geometric correspondence with the received image RI.

In one embodiment, the acquisition logic 104 of the computing device 18 can perform a geometric calibration by automatically identifying landmarks in the received image RI and registering the received image RI. The registration process can start by identifying vertical edges in the feeding station 12. In one embodiment, the identification of vertical edges can be performed by an edge detection algorithm tuned for vertical edges. To avoid the inclusion of extraneous edges (e.g., the right and left sides of holes or stains in the wood), a Hough transform, an algorithm which finds all significant, straight edges in the image, can be used. In one embodiment, by using the spacing between the edges, changes in zoom and rotations can also be determined. In addition, the inclusion of a marker (e.g., black tape) to the front of the feeding station 12 can be used to determine the vertical alignment. The identification of the vertical edges can then be used to identify corresponding calibration or analysis regions (or boxes) in the received image RI that are used in analyzing and processing the received image RI. For example, a wide, short box, such as region 704 shown in FIG. 7A, can be automatically identified as corresponding to a region that is tested for the presence of a bird. Another box, such as region 702 shown in FIG. 7A, can be automatically identified that covers only the uniform background (provided by the background member 16) and is used for radiometric calibration.

In another embodiment, a fiducial marker (e.g., region 702 shown in FIG. 7A) can be placed on the feeding station 12 and/or the background member 16. The location of the fiducial marker in the received image RI can be compared to the location of the fiducial marker in the baseline frame BAS and a translation (e.g., the distance between corresponding x-y coordinates) of the fiducial marker between the received image RI and the baseline frame BAS can be determined. Once the translation is determined, the baseline frame BAS can be adjusted by the translation amount when forming the current background BKG. In one embodiment, the amount of the translation used between the baseline frame BAS and the current background BKG can be a floating point value calculated to the sub-pixel level (i.e., calculated to a portion of a pixel). In other words, the amount of translation between the baseline frame BAS and the current background BKG may not correspond to whole pixel values and may correspond to a point that is located between pixels. When adjusting the baseline frame BAS by a translation amount that is at the sub-pixel level (i.e., between pixels), the values of the pixels in the current background BKG can be generated using interpolation techniques on the color and brightness values of the neighboring pixels in the baseline frame BAS. In one embodiment, the color and brightness values of some neighboring pixels may be weighted relative to other neighboring pixels when performing the interpolation. For example, the baseline frame BAS can be considered a continuous image with the pixel values corresponding to sample points in the continuous image. Then when a translation, rotation, or zoom at the sub-pixel level is performed, the value between the sample points can be determined using interpolation techniques.

The acquisition logic 104 can perform a radiometric calibration on the baseline frame BAS using information from the calibration region(s) in order to adjust the brightness of the pixels in the current background BKG to be similar to the brightness of the pixels in the received image RI such that the pixels have a direct radiometric correspondence. In other words, the brightness levels of the pixels of the current background BKG should substantially correspond to the brightness levels of the received image RI such that when the images are compared, the pixels not corresponding to a bird can be easily identified since the difference between the corresponding pixels in the received image RI and the current background BKG can be zero or substantially close to zero. The acquisition logic 104 can measure the brightness of the calibration region(s) in the received image RI and compare the brightness from the calibration region(s) in the received image RI with the corresponding brightness of the calibration region(s) in the baseline frame BAS. If the brightness levels in the two images (or frames) are not the same, the acquisition logic 104 can form the current background BKG by modifying (or adjusting) the brightness of the baseline frame BAS to the brightness of the received image RI. Otherwise, if the brightness levels in the received image RI and the baseline frame BAS are the same, the baseline frame BAS can be used as the current background BKG. The brightness level of the baseline frame BAS is adjusted when forming the current background BKG in order to provide for substantially similar brightness levels when comparing the current background BKG and the received image RI.

In one embodiment, radiometric calibration can be performed by adjusting the gain in the baseline frame BAS to match the gain in the received image RI. The gain adjustment to the baseline frame BAS can include individual gain amounts for each of the red, green and blue values associated with a pixel. The amount of the red, green and blue gain adjustments can be determined by minimizing the error E between the received image RI and the baseline frame BAS for the pixels in the calibration region using the equation set forth in Equation 1:

$$E = \sum_{x,y} (f_{r1} - g_r f_{r0})^2 + (f_{g1} - g_g f_{g0})^2 + (f_{b1} - g_b f_{b0})^2 \quad (1)$$

Where x and y correspond to pixel coordinates in the calibration region, $f_{r1}$ corresponds to the red component of the received image RI, $f_{g1}$ corresponds to the green component of the received image RI, $f_{b1}$ corresponds to the blue component of the received image RI, $f_{r0}$ corresponds to the red component of the baseline frame BAS, $f_{g0}$ corresponds to the green component of the baseline frame BAS, $f_{b0}$ corresponds to the blue component of the baseline frame BAS, $g_r$ corresponds to the gain for the red component, $g_g$ corresponds to the gain for the green component, and $g_b$ corresponds to the gain for the blue component.

After the current background BKG has been created, the current background BKG can be compared to the received image RI (step 206). Based on the comparison of the current background BKG and the received image RI, a determination can be made as to whether a bird is present in the received image RI (step 208). The determination as to whether a bird is present in the received image RI can be made by determining if there are more than a predetermined number of "bird" pixels in the received image RI or within a predetermined area of the received image (e.g., region 704 of FIG. 7A). The predetermined number of bird pixels can correspond to a number of pixels in the received image or predetermined area of the received image that provides a substantial probability that a bird is present in the received image and accounts for the possibility that there may be some discrepancies (i.e., non-zero pixels that do not represent a bird) between the received image RI and the current background BKG. A bird pixel can be identified by determining if a pixel (or a region of pixels) in the received image RI is significantly different from (e.g., greater than a predefined threshold) the corresponding "background" pixel (or region of pixels) in the current background BKG. In one embodiment, the process for determining bird pixels can include determining difference values and norm functions as described below with respect to FIGS. 6A and 6B.

Once the presence or absence of a bird in the received image RI is determined, the process then proceeds to determine the last images that contain a bird in order to provide those images for further processing, e.g., removal of the background pixels, in order to prepare the images for identification by the bird identification process. Referring back to FIG. 5, if a bird is determined to be present in the received image RI, the sampling rate for the camera 14 can be set to a first sampling rate (step 210). However, if no bird is determined to present in the received image RI, the sampling rate for the camera 14 can be set to a second sampling rate (step 212) slower than the first sampling rate. In one embodiment, the first sampling rate can be 1 image every second and the second sampling rate can be 1 image every 2 seconds, but other sampling rates that are faster or slower can be used in other embodiments.

Once a bird is determined to be present in the received image RI and the sampling rate has been set to the first sampling rate, a determination is made as to whether a bird was present in the previous received image ($RI_{N-1}$) (step 214). If a bird was not present in the previous received image then the acquisition logic 104 "remembers" that a bird is present in the current received image RI (step 216) by setting a flag or other indicator in either image data 120 or memory 108 and returns to the beginning of the process to receive a new image. If a bird was present in the previous received image $RI_{N-1}$, then the acquisition logic 104 "remembers" that a bird is present in the current received image RI and in the previous received image $RI_{N-1}$ (step 218) by setting corresponding flags or other indicators in either image data 120 or memory 108 and returns to the beginning of the process to receive a new image.

Once a determination is made that a bird is not present in the received image RI and the sampling rate has been set to the second sampling rate, a determination is made as to whether a bird was present in the previous received image $RI_{N-1}$ (step 220). If a bird was not present in the previous received image $RI_{N-1}$, then the acquisition logic 104 returns to the beginning of the process to receive a new image. If a bird was present in the previous received image then the acquisition logic 104 saves the previous received image $RI_{N-1}$ and the next previous received image ($RI_{N-2}$) and their corresponding backgrounds $BKG_{N-1}$, $BKG_{N-2}$ in either image data 120 or memory 108 (step 222) for further processing as described below and returns to the beginning of the process to receive a new image. In addition, when saving the images for further processing, the parameters of the measurement and other additional information can be saved in statistical data 122 or elsewhere in memory 108. The acquisition logic 104 can them remember that a bird was not present in the current received image RI by setting corresponding flags or other indicators in either image data 120 or memory 108.

In one embodiment, the last images of the bird while still at the feeding station 12 (i.e., the previous received image $RI_{N-1}$ and the next previous received image $RI_{N-2}$) can be the images subjected to further processing in order to prepare the images for identification. The last images of the bird at the feeding station 12 can be the images selected for further processing in order to reduce the number of images that are processed. In the last image with a bird (i.e., the previous received image $RI_{N-1}$), the bird is likely to be preparing to leave (wings spread, or just moving), but in the image just before the last (i.e., the next previous image $RI_{N-2}$), which may have been captured one second earlier than the previous received image $RI_{N-1}$ depending on the first sampling rate used, the bird is more likely to be in a sagittal posture. An image of the bird in a sagittal posture may be more easily interpreted by the bird recognition software and can provide a more accurate identification of the bird. However, in other embodiments, other images of the bird at the feeding station may be processed and provided to the bird recognition software.

Figure 6A:
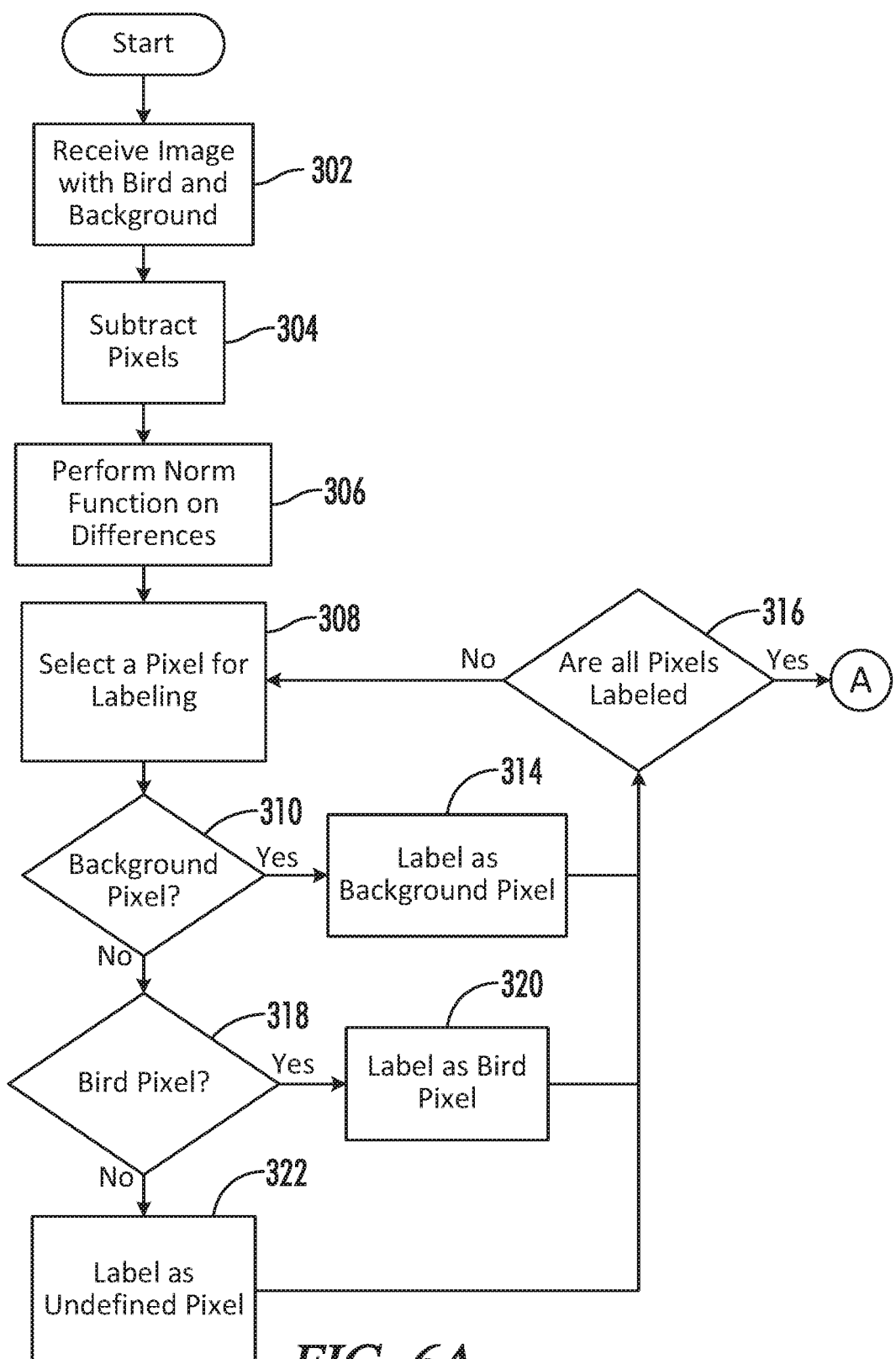
FIGS. 6A and 6B shows an embodiment of a process for removing background information from an image of a bird at a feeding station.
Figure 6B:
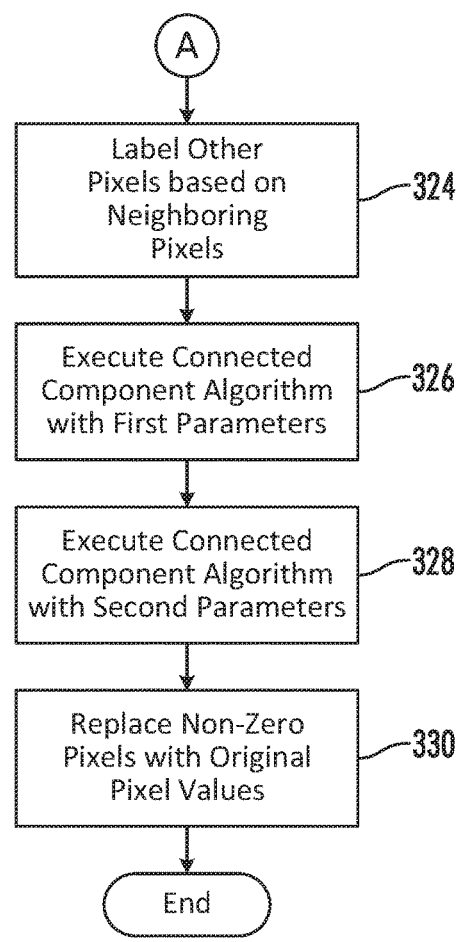

FIGS. 6A and 6B show an embodiment of a process for removing background pixels from an image containing a bird RI leaving only an image with the pixels associated with the bird (an "evaluation" image). In one embodiment, the process shown in FIGS. 6A and 6B can be used in step 156 of FIG. 4 to remove the background from an image of a bird at the feeding station 12. The process begins with the segmentation logic 106 receiving the image having a bird RI and the corresponding background frame or image BKG (step 302). Next, each of the pixels in the image having the bird RI are subtracted from the corresponding pixels in the background frame BKG (step 304). In another embodiment, each of the pixels in the background frame BKG are subtracted from the corresponding pixels in the image having the bird RI. Each pixel in the background frame BKG and the image having the bird RI can have red, green and blue values. In an embodiment, when subtracting pixels, the corresponding red values of the pixels can be subtracted, the corresponding green values of the pixels can be subtracted and the corresponding blue values of the pixels can be subtracted to yield corresponding red, green and blue difference values ($D_r$, $D_g$, $D_b$).

A norm function can be performed on the difference values $D_r$, $D_g$, $D_b$ for each pixel to generate a single value corresponding to each pixel (step 306). In one embodiment, a norm function (n) can be an operation which takes a vector (or matrix) and produces a single number. The norm function n has the following properties: n(0)=0 (a vector which is all zeros has a norm of 0); n(x)≥0 (the norm of any vector is a positive number); and n(x+y)≤n(x)+n(y) (for any x or y). In one embodiment, the norm function n applied to the difference values of a pixel can be a Euclidean norm or $L_2$ norm as set forth in Equation 2:

$$n=\sqrt{(D_r)^2(D_g)^2(D_b)^2} \qquad (2)$$

In still other embodiments other norm functions n can be applied to the difference values of a pixel.

Once the norm function n has been performed on the difference values for all of the pixels, one of the pixels can be selected for labeling (step 308). In one embodiment, the pixels can be labeled background, bird or undefined. After the pixel has been selected, a determination is made as to whether the pixel is a background pixel (step 310). In one embodiment, a pixel can be determined to be a background pixel if the value of the norm function n is less than a predetermined lower threshold value. If the pixel is determined to be a background pixel, then the pixel is labeled as a background pixel (step 312) and a determination is made as to whether all of the pixels have been labeled (step 316). If all of the pixels have not been labeled, the process selects another pixel for labeling.

If the pixel is not a background pixel, a determination is made as to whether the pixel is a bird pixel (step 318). In one embodiment, a pixel can be determined to be a bird pixel if the value of the norm function n is greater than a predetermined upper threshold value. If the pixel is determined to be a bird pixel, then the pixel is labeled as a bird pixel (step 320) and a determination is made as to whether all of the pixels have been labeled (step 316). If all of the pixels have not been labeled, the process selects another pixel for labeling. If the pixel is not a bird pixel, then the pixel is labeled as an undefined pixel (step 322) and a determination is made as to whether all of the pixels have been labeled (step 316). If all of the pixels have not been labeled, the process selects another pixel for labeling.

Once a determination is made that all of the pixels have been labeled, each of the pixels that were given the undefined label are relabeled to be either a bird pixel or a background pixels based on the labels provided to the neighboring pixels to the undefined pixel (step 324). In one embodiment, an undefined pixel can be relabeled as a bird pixel if a majority of the adjacent pixels (to the undefined pixel) have bird pixel labels or as a background pixel if a majority of the adjacent pixels (to the undefined pixel) have background pixel labels. In other embodiments, different techniques can be used to relabel the undefined pixels to either a bird pixel or a background pixel. For example, the undefined pixel can be relabeled as a background pixel if the value of the norm function n for the pixel is in proximity to the lower threshold or the undefined pixel can be relabeled as a bird pixel if the value of the norm function n is in proximity to the upper threshold.

After the undefined pixels have been relabeled as either bird pixels or background pixels, a connected component algorithm using a first set of parameters can be applied to the pixels (step 326). In one embodiment, the connected component algorithm can be used to define regions of path-connected pixels. Two pixels can be defined as connected if they are adjacent, their brightness difference (or color difference) is less than a specified difference threshold, and they are both brighter than a brightness threshold. Two pixels can be defined as path-connected if there is a path of connected pixels between them. In one embodiment, the first set of parameters used by the connected component algorithm can include: a difference threshold of 30 (i.e., any two pixels which are adjacent and which differ by no more than 30 brightness units are considered connected and in the same region); a brightness threshold of 3 (i.e., any pixel with a brightness less than or equal to 3 is considered background and cannot be connected to anything); and any region (i.e., group of path-connected pixels) with an area of 500 pixels or less has a brightness set to 0 (i.e., is erased). The execution of the connected component algorithm using a first set of parameters can be used to generate a first image having one or more large regions that include the bird pixels. The one or more large regions of bird pixels may have a few areas within the region that may be considered background pixels.

Figure 7D:
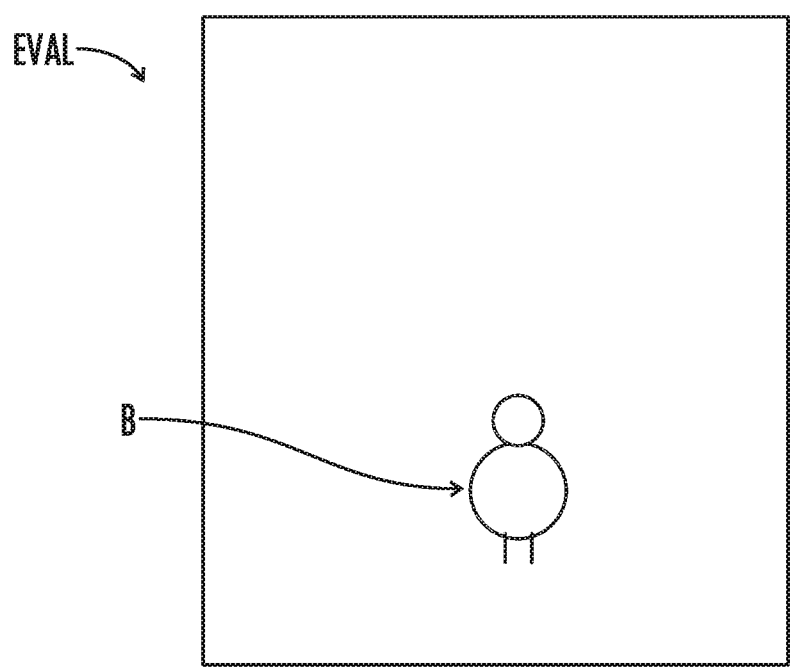

The connected component algorithm using a second set of parameters can be applied to the pixels in the first image generated from the first execution of the connected component algorithm (step 328). In one embodiment, the second set of parameters used by the connected component algorithm can include: a difference threshold of 0 (having a difference threshold of 0 allows pixels with a brightness of 0 to be connected in order to identify regions which are black (i.e., have a value of 0) but are completely inside a larger non-black region (i.e., have values greater than 0) to be identified); a brightness threshold of −1 (i.e., any pixel with a brightness less than or equal to −1 is considered background and cannot be connected to anything); and no regions are erased. The execution of the connected component algorithm using the second set of parameters can be used to generate a second image having one or more large regions that include the bird pixels and a few smaller regions within the large region that may have been previously considered background pixels, but are now considered bird pixels. In one embodiment, each of the pixels in a region, including the smaller regions, can be provided with a non-zero value to indicate that the pixels should be considered bird pixels. In contrast, the pixels that have been designated as background pixels and are outside of a region can be provided with a zero value. The segmentation logic 106 can then replace the pixels from the resultant images of either the first execution of the connected component algorithm or the second execution of the connected component algorithm that have non-zero values or are assigned to a connected component algorithm region with the corresponding pixel values from the image containing the bird RI that was provided to the segmentation logic 106 (step 330) to generate the evaluation image (EVAL), as shown in FIG. 7D, that can be sent to the bird recognition software.

The image containing the bird processed according to the process of FIGS. 6A and 6B may include one or more shadows that may be classified as bird pixels, but, in fact, are background pixels. The inclusion of background pixels that have been misclassified as bird pixels in the image provided to the bird recognition software can reduce the effectiveness of the bird recognition software as the bird recognition software has to process the background pixels as part of the identification process. Shadows may be present in the image even if direct sunlight is not present when capturing the image. The presence of shadows in the image, including a shadow of the bird itself, may result in some of the pixels being lighter or darker in the received image RI than in the corresponding background BKG because the radiometric calibration is performed on the entire baseline frame BAS based on the brightness levels in the calibration region(s). For example, if there is no shadow in the corresponding calibration region(s) of the received image RI, the generation of the background image BKG would not account for the presence of shadows in other locations of the received image RI. When the comparison is performed, the areas of the received image RI with a shadow would provide for a non-zero region in the difference image. Similarly, if there is a shadow in the corresponding calibration region(s) of the received image RI, the generation of the background image BKG would not account for the presence of non-shadowed areas in other locations of the received image RI. When the comparison is performed, the areas of the received image RI without a shadow would provide for a non-zero region in the difference image. The segmentation logic 106 can remove the shadows from an image by identifying a region of pixels that all have substantially the same difference value or norm function n within a predefined range and changing the value of the pixels to zero. A shadow region may result in a region of pixels having the same difference value within a predefined range because the only difference between the image and the corresponding background is that the area of the image in the shadow is slightly darker than the corresponding area in the corresponding background. The predefined range can be based on the expected difference in brightness levels of the pixels caused by the shadows since the colors of the pixels remain substantially similar.

In one embodiment, the animal recognition software may use a machine learning algorithm to identify the animal in the evaluation image (EVAL) (e.g., the processed image or the received/captured image) that is provided to the animal recognition software. As known in the art, machine learning algorithms generally involve training a computer through the use of artificial intelligence by analyzing sample data sets to recognize data patterns that likely result in certain outputs or outcomes. Such machine learning algorithms may be used by the identification computer 22 or the computing device 18 to identify animals in evaluation images (EVAL) having different feeding stations 12 and/or background members 16 (or portions thereof). The feeding stations 12 and/or background members 16 in the evaluation image (EVAL) may have different shapes and/or different colors or patterns that need to be recognized (and discarded) by the animal recognition software such that the animal recognition software is able to more accurately identify the animal in the evaluation image (EVAL).

In an embodiment, the machine learning algorithm may be trained to learn that a set of pixels having a certain shape and/or a certain color or color profile in an image corresponds to the background shape and/or color or colors of the feeding station 12 or the background member 16 and that the set of pixels should not be considered when identifying the animal in the evaluation image (EVAL). Then, when the animal recognition software identifies a set of pixels in an evaluation image (EVAL) having the same or a substantially similar predetermined shape and/or color or color profile, the animal recognition software can disregard those pixels as background pixels when attempting to recognize the animal in the evaluation image (EVAL). In another embodiment, the machine learning algorithm of the animal recognition software may be provided images with only the animal to be recognized and without any background information (similar to the processed image from step 156 of FIG. 4) during the training process. In still other embodiments, during the training process for the machine learning algorithm of the animal recognition software, other images having different shapes, colors or color profiles for the feeding station 12 and/or the background member 16 can be synthetically generated by substituting the new shape and/or color information for the "background" pixels in the previously processed images and providing the new images to the animal recognition software. If the background member 16 is not used in the animal identification system 10, synthetically generated "background scenes" may also be generated as described above.

Figure 8:
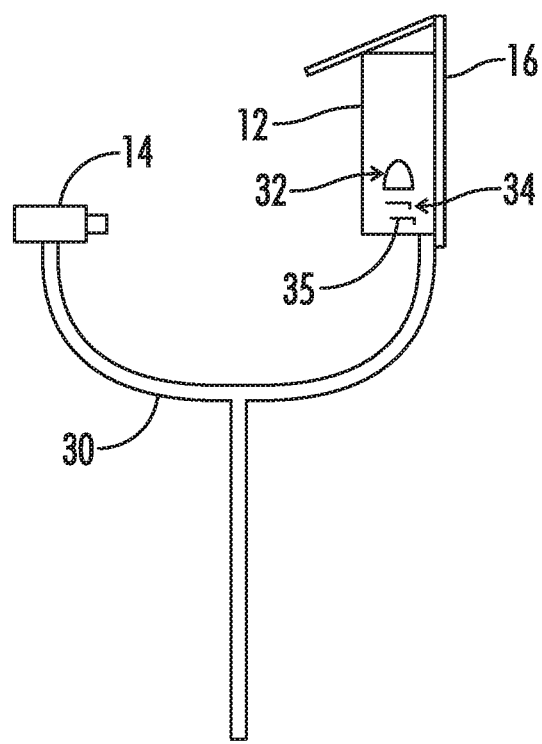
FIG. 8 shows a side view of an embodiment of the camera, feeding station and background member of the bird identification system of FIG. 1.

In another embodiment of the animal identification system 10, the camera 14, the feeding station 12 and the background member 16 can be arranged as shown in FIG. 8. The positioning of the camera 14 relative to the feeding station 12 via a coupling member 30 permits the camera 14 to capture profile images (or side view images) of the animal (e.g., a bird) at the feeding station 12 (see e.g., FIG. 10). The capturing of profile or side view images of the animal or bird can facilitate animal recognition by software to provide more accurate animal or species identifications.

In this regard, the profile or side view of the animal can provide the animal recognition software with information directed to the relative size and/or profile of the animal or bird that may be used to identify the animal or bird. In addition, the sides of the animal may exhibit unique markings that help in species identification. As an example, a bird may have a unique pattern of feather colors on or along its wings that are visible from a side view, and such pattern may be used to help identify the species of the bird. Having the camera oriented relative to the bird to view a side profile of the bird may provide more accurate results relative to embodiments in which the camera may be mounted differently.

Figure 9:
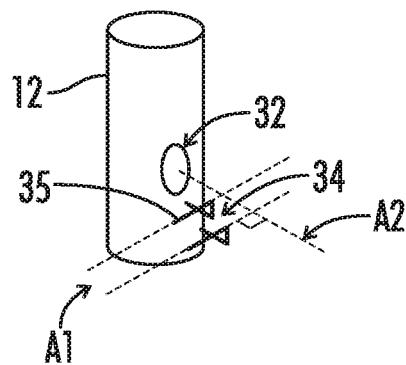
FIG. 9 shows a perspective view of an embodiment of the feeding station from the embodiment of FIG. 8.
Figure 10:
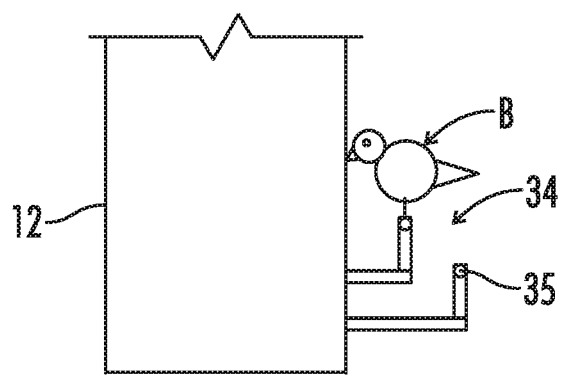
FIG. 10 shows a partial side view of the feeding station from the embodiment of FIG. 9 with a bird accessing the feeding station.

The feeding station 12 can include an opening 32 for the animal or bird to access the food (or water and/or other attractant) in the feeding station 12 and a perch 34 (or other structure) for the animal or bird to stand or rest on while obtaining the food in the feeding station 12 via the opening 32. In the embodiments shown in FIGS. 8-10, the perch 34 may include more than one bar or rod 35 (and associated mounting structures) to accommodate animals or birds of different sizes. While one embodiment of a mounting structure for the bar or rod 35 is shown in FIGS. 8-10, it is to be understood that any suitable mounting arrangement can be used for the bar or rod 35 in other embodiments. The bar(s) or rod(s) 35 of the perch 34 can be an elongated member that extends substantially horizontally in front of the opening 32. In one embodiment, the bar or rod 35 can be positioned relative to the opening 32 such that the animal or bird is positioned in a profile or side view for the camera 14 when the animal or bird is standing or resting on the bar or rod 35 and preparing to access the opening 32.

As shown in FIG. 9, the bars or rods 35 of the perch 34 can be positioned such that the longitudinal axes (A1) of the bars or rods 35 are substantially perpendicular to an axis (A2) of the opening 32. However, in other embodiments, the longitudinal axes (A1) of the bars or rods 35 may be positioned at angles greater than or less than 90 degrees relative to the axis (A2) of the opening 32. In order to obtain the profile images of the animal or bird while standing or resting on a bar or rod 35, the camera 14 can be positioned via the coupling member 30 such that the field of view of the camera 14 is substantially parallel to the longitudinal axis (A1) of the bar or rod 35 or is substantially perpendicular to the axis (A2) of the opening 32. By having the field of view of the camera 14 substantially parallel to the longitudinal axis (A1) of the bar or rod 35 (or substantially perpendicular to the axis (A2) of the opening 32), it is more likely that a profile (or side) view of the animal or bird will be obtained by the camera 14.

In this regard, for an elongated member having a longitudinal axis extending from one end of an elongated member to the opposite end, birds are generally more likely to grip or stand on the elongated member such that the longitudinal axis passes through both feet or talons of the bird, as shown by FIG. 10. Thus, assuming that the bird is so oriented, the camera can be positioned in a predefined proximity and orientation relative to the feeder such that it has a side-profile view of the bird when standing on the elongated member of the perch. Specifically, such an effect can be achieved when the camera is positioned so that its field of view is substantially parallel to the longitudinal axis of the elongated member. The term "substantially" refers to the fact that the field of view and the longitudinal axis do not have be precisely parallel to realize the effect of having the camera positioned to view a side profile of the bird for facilitating species identification. The use of a perch having an elongated member, as described above, not only increases the chances that the camera can view unique color patterns on a side of the bird, but it also encourages birds to stand in a similar orientation for each captured image, thereby reducing variations in the orientation of the bird relative to the camera from one image to the next. Reducing such variations can provide more consistent and accurate species identification, particularly when machine learning is used as described above.

In other embodiments, the camera 14 can be positioned, by coupling member 30, at any suitable position or angle with respect to either the bar or rod 35 and/or the opening 32 such that the field of view of the camera 14 can capture a profile (or side) view of an animal or bird standing on the bar or rod 35. FIG. 10 shows an embodiment of the feeding station 12, as seen by camera 14, with a bird (B) positioned in a profile (or side) view for the camera 14.

Embodiments within the scope of the present application include program products with machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions include, for example, instructions and data which cause a general purpose computer, special purpose computer, or special purpose processing machine to perform a certain function or group of functions. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A system for capturing images of animals for identification comprising:
    a camera having a field of view and configured to capture images of objects within the field of view;
    a feeding station positioned adjacent to the camera, wherein the feeding station is located within the field of view of the camera;
    a member positioned adjacent to the feeding station and opposed to the camera, wherein at least a portion of the member is within the field of view of the camera; and
    a computing device coupled to the camera to receive the images captured by the camera, the computing device comprising:
        a processing unit configured to execute instructions; and
        a memory having the instructions stored thereon, the memory coupled to the processing unit to provide the instructions to the processing unit, wherein the instructions cause the processing unit to:
            receive an image from the camera;
            determine whether an animal is present in the received image based on a comparison of the received image and a predefined background image of at least the member stored in memory;
            identify a first set of pixels and a second set of pixels in the received image in response to a determination that an animal is present in the received image, wherein the first set of pixels correspond to pixels associated with the animal and the second set of pixels correspond to pixels associated with the member and the feeding station;
            generate an evaluation image by removing the second set of pixels from the received image; and
            provide the evaluation image to animal recognition software, the animal recognition software configured to provide an identification of the animal based on the evaluation image.

2. The system of claim 1, wherein the instructions cause the processing unit to perform at least one of a geometric calibration or a radiometric calibration on the background image prior to comparing the received image with the background image.

3. The system of claim 1, wherein the instructions cause the processing unit to compare the received image with a background image by calculating, for each pixel, a difference value between the received image and the background image.

4. The system of claim 3, wherein the difference value corresponds to a difference in color between the received image and the background image.

5. The system of claim 1, wherein the animal recognition software uses a machine learning algorithm to provide an identification of the animal, wherein the machine learning algorithm of the animal recognition software is trained using synthetically generated images.

6. The system of claim 1, wherein the feeding station comprises a perch having a center axis and the camera is positioned relative to the feeding station such that the field of view of the camera is substantially parallel to the center axis of the perch.

7. The system of claim 1, wherein the background image includes an image of the feeding station.

8. The system of claim 1, further comprising a perch extending from the feeding station, wherein the member is positioned such that the animal is located between the camera and the member when the animal is on the perch.

9. A system for capturing images of animals for identification comprising:
    a camera having a field of view and configured to capture images of objects within the field of view:
    a feeding station positioned adjacent to the camera, wherein the feeding station is located within the field of view of the camera;
    a member positioned adjacent to the feeding station and opposed to the camera, wherein at least a portion of the member is within the field of view of the camera; and a computing device coupled to the camera to receive the images captured by the camera, the computing device comprising:
   a processing unit configured to execute instructions; and
   a memory having the instructions stored thereon, the memory coupled to the processing unit to provide the instructions to the processing unit, wherein the instructions cause the processing unit to:
      receive an image from the camera;
      compare the received image with a background image stored in memory by calculating, for each pixel, a difference value between the received image and the background image;
      determine whether an animal is present in the received image by identifying a plurality of pixels having a difference value greater than a predetermined value;
      identify a first set of pixels and a second set of pixels in the received image in response to a determination that an animal is present in the received image, wherein the first set of pixels correspond to pixels associated with the animal and the second set of pixels correspond to pixels associated with the member and the feeding station;
      generate an evaluation image by removing the second set of pixels from the received image; and
      provide the evaluation image to animal recognition software, the animal recognition software configured to provide an identification of the animal based on the evaluation image.

10. A system for capturing images of animals for identification comprising:
   a camera having a field of view and configured to capture images of objects within the field of view;
   a feeding station positioned adjacent to the camera, wherein the feeding station is located within the field of view of the camera;
   a member positioned adjacent to the feeding station and opposed to the camera, wherein at least a portion of the member is within the field of view of the camera; and
   a computing device coupled to the camera to receive the images captured by the camera, the computing device comprising:
      a processing unit configured to execute instructions; and
      a memory having the instructions stored thereon, the memory coupled to the processing unit to provide the instructions to the processing unit, wherein the instructions cause the processing unit to:
         receive an image from the camera;
         determine whether an animal is present in the received image;
         identify a first set of pixels and a second set of pixels in the received image in response to a determination that an animal is present in the received image, wherein the first set of pixels correspond to pixels associated with the animal and the second set of pixels correspond to pixels associated with the member and the feeding station;
         identify a shadow in the first set of pixels;
         designate pixels in the first set of pixels corresponding to the identified shadow as part of the second set of pixels;
         generate an evaluation image by removing the second set of pixels from the received image; and
         provide the evaluation image to animal recognition software, the animal recognition software configured to provide an identification of the animal based on the evaluation image.

11. A system for capturing images of animals for identification comprising:
   a camera having a field of view and configured to capture images of objects within the field of view;
   a feeding station positioned adjacent to the camera, wherein the feeding station is located within the field of view of the camera;
   a member positioned adjacent to the feeding station and opposed to the camera, wherein at least a portion of the member is within the field of view of the camera; and
   a computing device coupled to the camera to receive the images captured by the camera, the computing device comprising:
      a processing unit configured to execute instructions; and
      a memory having the instructions stored thereon, the memory coupled to the processing unit to provide the instructions to the processing unit, wherein the instructions cause the processing unit to:
         receive an image from the camera;
         determine whether an animal is present in the received image;
         identify a first set of pixels and a second set of pixels in the received image in response to a determination that an animal is present in the received image, wherein the first set of pixels correspond to pixels associated with the animal and the second set of pixels correspond to pixels associated with the member and the feeding station;
         generate an evaluation image by removing the second set of pixels from the received image;
         remove the second set of pixels by setting the second set of pixels to a predetermined value; and
         provide the evaluation image to animal recognition software, the animal recognition software configured to provide an identification of the animal based on the evaluation image.

12. A method for generating images of animals for identification comprising:
   capturing, with a camera, images of a feeding station and a member positioned adjacent to the feeding station;
   providing, by the camera, the captured images to a computing device;
   selecting an image, by the computing device, from the captured images provided by the camera;
   determining whether an animal is present in the selected image based on a comparison of the selected image and a predefined background image of at least the member stored in memory;
   identifying a first set of pixels and a second set of pixels in the selected image in response to a determination that an animal is present in the selected image, wherein the first set of pixels correspond to pixels associated with the animal and the second set of pixels correspond to pixels associated with the member and the feeding station;
   generating an evaluation image by removing the second set of pixels from the selected image; and
   providing the evaluation image to animal recognition software, the animal recognition software configured to provide an identification of the animal based on the evaluation image.

13. The method of claim 12, further comprising performing at least one of a geometric calibration or a radiometric calibration on the background image prior to comparing the selected image with the background image.

14. The method of claim 12, wherein the comparing the selected image with the background image includes calculating, for each pixel, a difference value between the selected image and the background image.

15. The method of claim 14, wherein the difference value corresponds to a difference in color between the selected image and the background image.

16. The method of claim 12, wherein the animal recognition software uses a machine learning algorithm to provide an identification of the animal, wherein the machine learning algorithm of the animal recognition software is trained using synthetically generated images.

17. The method of claim 12, wherein the capturing images of the feeding station and the member positioned adjacent to the feeding station include capturing images of a profile view of an animal at the feeding station.

18. The method of claim 12, wherein the capturing comprises capturing the selected image when the animal is on a perch extending from the feeding station and between the camera and the member.

19. The method of claim 12, wherein the background image includes an image of the feeding station.

20. A method for generating images of animals for identification comprising:
   capturing, with a camera, images of a feeding station and a member positioned adjacent to the feeding station;
   providing, by the camera, the captured images to a computing device;
   selecting an image, by the computing device, from the captured images provided by the camera;
   determining whether an animal is present in the selected image includes comparing the selected image with a background image stored in memory, wherein the comparing the selected image with the background image includes calculating, for each pixel, a difference value between the selected image and the background image, wherein the determining whether an animal is present includes identifying a plurality of pixels having a difference value greater than a predetermined value;
   identifying a first set of pixels and a second set of pixels in the selected image in response to a determination that an animal is present in the selected image, wherein the first set of pixels correspond to pixels associated with the animal and the second set of pixels correspond to pixels associated with the member and the feeding station;
   generating an evaluation image by removing the second set of pixels from the selected image; and
   providing the evaluation image to animal recognition software, the animal recognition software configured to provide an identification of the animal based on the evaluation image.

21. A method for generating images of animals for identification comprising:
   capturing, with a camera, images of a feeding station and a member positioned adjacent to the feeding station;
   providing, by the camera, the captured images to a computing device;
   selecting an image, by the computing device, from the captured images provided by the camera;
   determining whether an animal is present in the selected image;
   identifying a first set of pixels and a second set of pixels in the selected image in response to a determination that an animal is present in the selected image, wherein the first set of pixels correspond to pixels associated with the animal and the second set of pixels correspond to pixels associated with the member and the feeding station;
   identifying a shadow in the first set of pixels and designating pixels in the first set of pixels corresponding to the identified shadow as part of the second set of pixels;
   generating an evaluation image by removing the second set of pixels from the selected image; and
   providing the evaluation image to animal recognition software, the animal recognition software configured to provide an identification of the animal based on the evaluation image.

22. A method for generating images of animals for identification comprising:
   capturing, with a camera, images of a feeding station and a member positioned adjacent to the feeding station;
   providing, by the camera, the captured images to a computing device;
   selecting an image, by the computing device, from the captured images provided by the camera;
   determining whether an animal is present in the selected image;
   identifying a first set of pixels and a second set of pixels in the selected image in response to a determination that an animal is present in the selected image, wherein the first set of pixels correspond to pixels associated with the animal and the second set of pixels correspond to pixels associated with the member and the feeding station;
   generating an evaluation image by removing the second set of pixels from the selected image, wherein the generating an evaluation image includes removing the second set of pixels by setting the second set of pixels to a predetermined value; and
   providing the evaluation image to animal recognition software, the animal recognition software configured to provide an identification of the animal based on the evaluation image.

23. A system for capturing images of animals for identification comprising:
   a camera configured to capture an image;
   a feeding station positioned within a field of view of the camera, the feeding station having a perch;
   a member positioned within the field of view of the camera such that an animal on the perch is between the member and the camera; and
   a computing device having at least one processor and memory storing a predefined background image of at least the member, the at least one processor programmed with instructions that when executed cause the at least one processor to:
   receive the image captured by the camera;
   compare the received image to the predefined background image;
   determine that the animal is present in the image based on a comparison of the image and the predefined background image;
   identify a first set of pixels and a second set of pixels in the received image in response to a determination that the animal is present in the received image, wherein the first set of pixels define an image of the animal and the second set of pixels define an image of at least the member;

generate an evaluation image by removing the second set of pixels from the received image; and provide the evaluation image to animal recognition software, the animal recognition software configured to provide an identification of the animal based on the evaluation image.

24. The system of claim 23, wherein the member is mounted on the feeding station.

25. The system of claim 24, wherein the member has a planar surface facing the camera.

* * * * *